United States Patent
Hiraguchi et al.

(10) Patent No.: US 7,913,946 B2
(45) Date of Patent: Mar. 29, 2011

(54) INSERT BODY, REEL, AND RECORDING TAPE CARTRIDGE

(75) Inventors: Kazuo Hiraguchi, Odawara (JP); Ren Ishikawa, Odawara (JP); Yasuhiro Mori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 11/953,427

(22) Filed: Dec. 10, 2007

(65) Prior Publication Data

US 2008/0135664 A1 Jun. 12, 2008

(30) Foreign Application Priority Data

Dec. 11, 2006 (JP) .................... 2006-332758

(51) Int. Cl.
*B65H 75/08* (2006.01)
(52) U.S. Cl. .............. 242/613.4; 242/348; 242/242; 242/610.5
(58) Field of Classification Search .......... 242/348, 242/348.2, 609, 610, 614.4, 610.5, 610.6, 242/613, 613.4
See application file for complete search history.

(56) References Cited

U.S. PATENT DOCUMENTS

| | | | | | |
|---|---|---|---|---|---|
| 3,485,456 | A | * | 12/1969 | Tellen et al. | 242/608.4 |
| 3,485,457 | A | * | 12/1969 | Hultgren | 242/613.4 |
| 7,300,016 | B2 | * | 11/2007 | Brown et al. | 242/613.4 |
| 7,347,397 | B2 | * | 3/2008 | Ishikawa et al. | 242/613.4 |
| 7,523,887 | B2 | * | 4/2009 | Ishikawa | 242/613.4 |
| 7,533,840 | B2 | * | 5/2009 | Sumiya et al. | 242/348 |
| 2003/0226931 | A1 | * | 12/2003 | Morita | 242/610.4 |

FOREIGN PATENT DOCUMENTS

JP 2000-298964 A 10/2000
JP 2004-127358 A 4/2004

OTHER PUBLICATIONS

Notice of Reasons for Rejection, dated Jul. 13, 2010, issued in corresponding JP Application No. 2006-332758, 6 pages in English and Japanese.

* cited by examiner

*Primary Examiner* — William A Rivera
(74) *Attorney, Agent, or Firm* — Sughrue Mion, PLLC

(57) ABSTRACT

A reinforcement ring is insert-molded as an insert body on a reel hub of a reel around which recording tape is wound. The reinforcement ring includes a metal ring at least whose inner peripheral surface is covered by a resin layer. The clearance between the reinforcement ring and a mold during reel molding can be reduced, and the amount of eccentricity of the insert body with respect to the reel hub can be reduced.

8 Claims, 13 Drawing Sheets

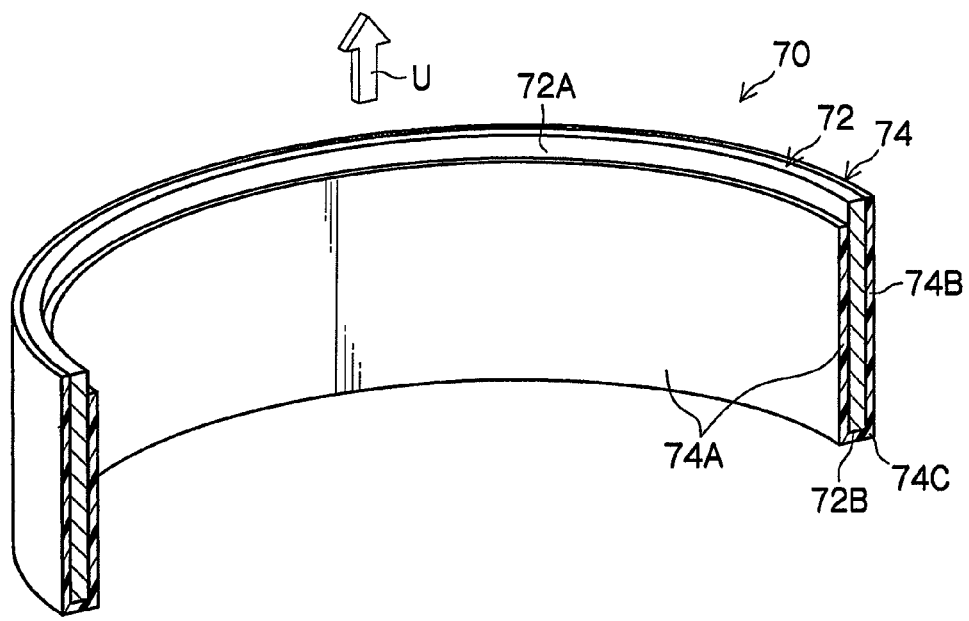
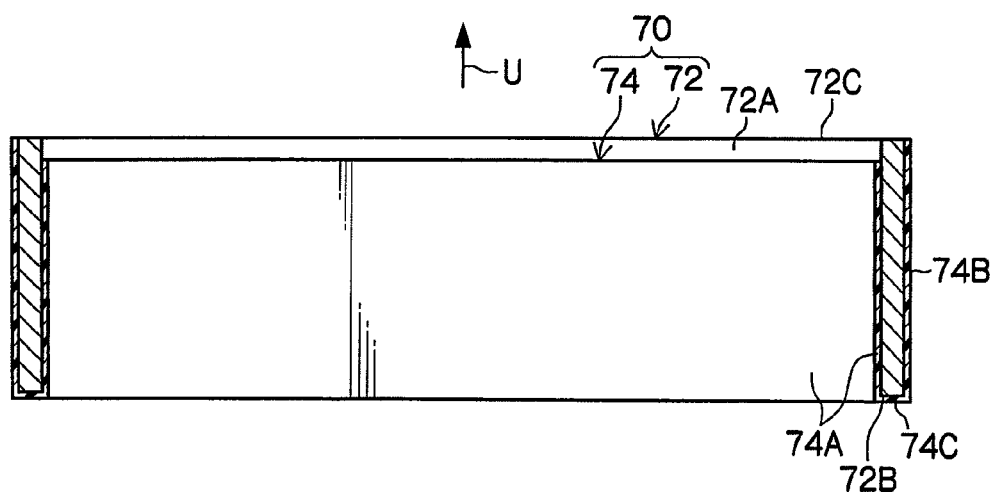

INSERT BODY, REEL, AND RECORDING TAPE CARTRIDGE

CROSS-REFERENCE TO RELATED APPLICATION

This application claims priority under 35 USC 119 from Japanese Patent Application No. 2006-332758, the disclosure of which is incorporated by reference herein.

BACKGROUND OF THE INVENTION

1. Field of the Invention

The present invention relates to an insert body for reinforcing a reel onto which recording tape such as magnetic tape, for example, is wound.

2. Description of the Related Art

Technology is known where, in order to ensure the strength of a reel hub with respect to the winding pressure of magnetic tape, a reinforcement ring made of metal is disposed by insert molding on the inner peripheral surface of the reel hub (e.g., see Japanese Patent Application Publication (JP-A) No. 2004-127358).

However, as mentioned above, in this conventional technology, the reinforcement ring is made of metal, so there has been a limit on reducing the clearance between the mold for molding the reel hub and the reinforcement ring loaded in that mold. That the clearance between the mold and the reinforcement ring is large causes eccentricity between the mold—that is, the reel hub—and the reinforcement ring.

SUMMARY OF THE INVENTION

In consideration of this circumstance, it is an object of the present invention to obtain an insert body with which the clearance between it and the mold can be reduced. It is another object of the present invention to obtain a reel with which the amount of eccentricity of the insert body with respect to a reel hub can be reduced. It is still another object of the present invention to obtain a recording tape cartridge with which the occurrence of recording and playback errors with respect to recording tape can be prevented using the reel.

An insert body of a first aspect of the invention is an insert body for insert molding on an inner side of a reel hub formed in a cylinder shape from a resin material, the insert body including: a cylinder-shaped metal ring including a metal material; and a resin layer that covers an inner peripheral surface of the metal ring.

In the insert body of the first aspect of the invention, the inner peripheral surface of the metal ring made of metal that is the surface facing the mold is covered by the resin layer, so the clearance between the insert body and the mold can be reduced in comparison to a configuration that allows the metal surface to be exposed to the mold.

In this manner, with the insert body of the first aspect, the clearance between the insert body and the mold can be reduced. It will be noted that the resin layer is not limited to a configuration where it covers the entire inner peripheral surface.

In the insert body of the first aspect, the roundness of an inner peripheral surface of the resin layer may be 50 μm or less.

With the insert body of this configuration, the roundness of the resin layer is high, so the clearance between the insert body and the mold can be reliably reduced. It will be noted that it is preferable for the roundness of the inner surface of the insert body to be 30 μm or less. When the roundness of the insert body exceeds 50 μm, for example, and the clearance between the insert body and the mold is made 50 μm or less, there is the potential for interference between the insert body and the mold to arise, but by making the roundness of the insert body 50 μm or less, the clearance between the insert body and the mold can be made 50 μm or less, and by making the roundness of the insert body 30 μm or less, the clearance between the insert body and the mold can be made 30 μm or less.

In the insert body of the first aspect of the invention, the resin layer may be formed by injection molding in another mold before being loaded in a mold for forming the reel hub.

In the insert body of this configuration, the resin layer is formed by insert molding, so the dimensional precision (roundness) of the resin layer can be ensured regardless of the dimensional precision of the metal ring. Thus, for example, variations in the roundness of the metal ring can be absorbed by the resin layer, so it becomes possible to use a metal ring whose dimensional precision is low in comparison to the mold.

A second aspect of the invention is a reel including: a reel hub that is formed in a cylinder shape from a resin material and whose outer peripheral surface is a take-up surface for winding recording tape; and an insert body attached to an inner side of the reel hub and provided with a cylinder-shaped metal ring including a metal material, and further provided with a resin layer that covers an inner peripheral surface of the metal ring.

In the reel of the second aspect of the invention, the insert body is integrated by insert molding on the inner side of the reel hub. Because this insert body is the insert body of the first aspect, the clearance between the insert body and the mold for molding the reel hub can be reduced, and the amount of eccentricity of the insert body with respect to the reel hub can be reduced.

In this manner, with the reel of the second aspect of the invention, the amount of eccentricity of the insert body with respect to the reel hub can be reduced.

A recording tape cartridge pertaining to a third aspect of the invention includes: a case; a reel that is rotatably housed inside the case, the reel including a reel hub that is formed in a cylinder shape by a resin material and whose outer peripheral surface is a take-up surface for winding recording tape, and an insert body attached to an inner side of the reel hub and provided with a cylinder-shaped metal ring including a metal material, and further provided with a resin layer that covers an inner peripheral surface of the metal ring; and recording tape that is wound around the outer peripheral surface of the reel hub and is capable of being taken up and pulled out with rotation of the reel.

In the recording tape cartridge of the third aspect, the recording tape wound around the outer peripheral surface of the reel hub of the reel is taken up or pulled out with respect to the reel in accompaniment with the rotation of the reel and enters and exits the case. Information is recorded to, and played back from, the portion of the recording tape positioned outside the case.

Here, because the reel hub of the reel is reinforced in the radial direction by the insert body, deformation of the reel hub is controlled, whereby deformation (partial stretching, etc.) in the width direction of the recording tape is controlled. For this reason, a change in the signal reading and writing position with respect to a reference edge (tracking) is controlled, and it becomes possible to prevent recording errors and playback errors from occurring.

In this manner, in the recording tape cartridge of this aspect, the occurrence of recording and playback errors with respect to the recording tape can be prevented using the reel.

As described above, the insert body pertaining to the invention has the excellent effect that the clearance between it and the mold can be reduced. Further, the reel pertaining to the invention has the excellent effect that the amount of eccentricity of the insert body with respect to the reel hub can be reduced. Moreover, the recording tape cartridge pertaining to the invention has the excellent effect that the occurrence of recording and playback errors with respect to the recording tape can be prevented using the reel.

BRIEF DESCRIPTION OF THE DRAWINGS

FIGS. 1A and 1B are diagrams showing a reinforcement ring pertaining to a first embodiment of the present invention that has been cut substantially in half, with FIG. 1A being a perspective diagram and FIG. 1B being a front diagram;

DETAILED DESCRIPTION OF THE INVENTION

A reinforcement ring 70 serving as an insert body pertaining to a first embodiment of the invention, a reel 28 to which the reinforcement ring 70 has been applied, and a recording tape cartridge 10 to which the reel 28 has been applied will be described on the basis of FIG. 1A to FIG. 11. First, the general overall configuration of the recording tape cartridge 10 will be described, then the configuration of the reel 28 will be described, and thereafter the reinforcement ring 70 serving as an insert body that is the relevant part of the present invention will be described.

(Configuration of Recording Tape Cartridge)

Figure 9A:
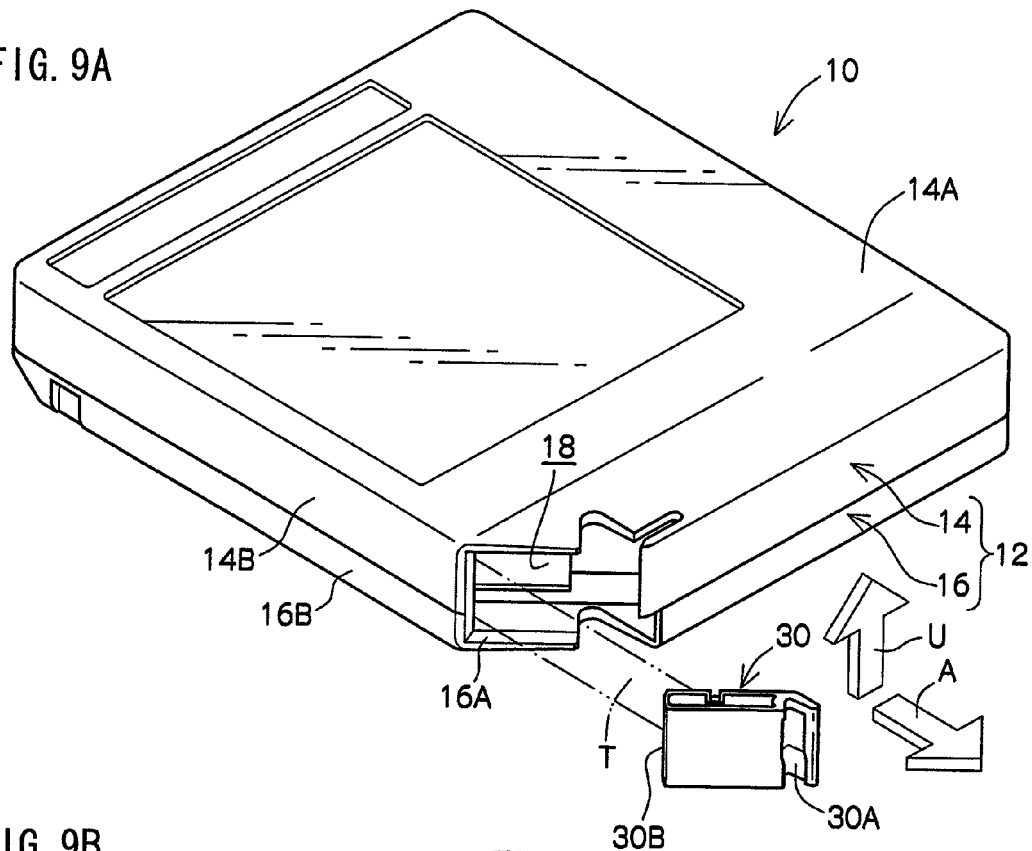
FIGS. 9A and 9B are diagrams showing the exterior of a recording tape cartridge to which the reel and the reinforcement ring pertaining to the first embodiment of the invention have been applied, with FIG. 9A being a perspective diagram where the recording tape cartridge is seen from above and FIG. 9B being a perspective diagram where the recording tape cartridge is seen from below.
Figure 9B:
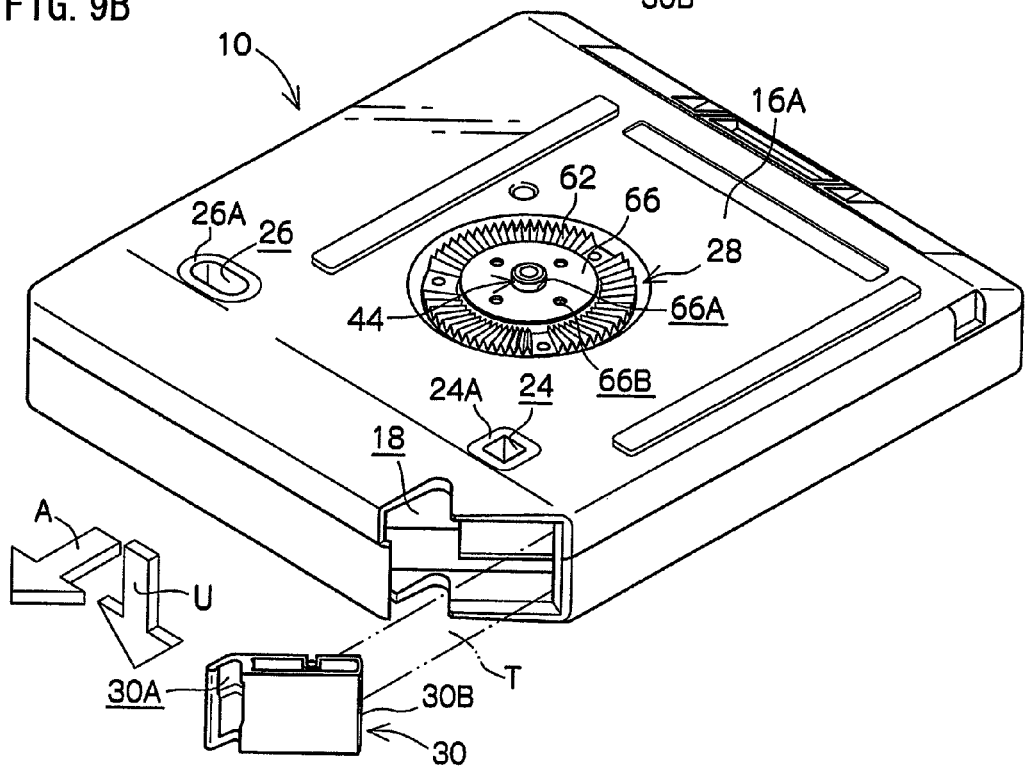

In FIG. 9A, there is shown a perspective diagram where the recording tape cartridge 10 is seen diagonally from above, and in FIG. 9B, there is shown a perspective diagram where the recording tape cartridge 10 is seen diagonally from below. Further, in FIG. 10, there is shown a cross-sectional diagram along line 2-2 of FIG. 9A. It will be noted that arrow A shown in FIGS. 9A and 9B represents the direction in which the recording tape cartridge 10 is loaded into a drive device. In the following description, the side represented by arrow A will be referred to as a front side for the sake of convenience. Further, the side represented by arrow U will be referred to as an upper side.

As shown in these drawings, the recording tape cartridge 10 is disposed with a case 12. The case 12 is configured by joining together an upper case 14 and a lower case 16. Specifically, the upper case 14 is configured as a result of a substantially frame-like peripheral wall 14B being disposed upright along the outer edge of a top plate 14A that has a substantially rectangular shape when seen in plan view, and the lower case 16 is configured as a result of a substantially frame-like peripheral wall 16B being disposed upright along the outer edge of a bottom plate 16A having a shape substantially corresponding to that of the top plate 14A. The case 12 is formed in a substantially box-like shape when the upper case 14 and the lower case 16 are joined together by ultrasonic welding or with screws in a state where the open end of the peripheral wall 14B and the open end of the peripheral wall 16B have been brought into contact with each other.

An opening 18 that slants with respect to the loading direction is formed in the case 12 by cutting out corner portions of the top plate 14A, the peripheral wall 14B, the bottom plate 16A, and the peripheral wall 16B at the front side in the direction in which the recording tape cartridge 10 is loaded into the drive device. Further, a circular gear opening 20 that penetrates the bottom plate 16A is disposed in the substantially center portion of the bottom plate 16A and serves to expose a later-described reel gear 62. An annular rib 22 is disposed on the edge portion of the gear opening 20 in the bottom plate 16A so as to project inside the case 12 (see FIG. 10) and serves to position the later-described reel 28.

A pair of positioning holes 24 and 26 are formed in the outer surface of the bottom plate 16A in the vicinity of the front end of the case 12. The pair of positioning holes 24 and 26 are disposed sac-like inside projecting portions (not shown) disposed upright inside the case 12 from the bottom plate 16A and are arranged apart from each other on a hypothetical line orthogonal to the loading direction. The positioning hole 24 near the opening 18 has a substantially square shape when seen in bottom view that circumscribes a positioning pin of the drive device, and the positioning hole 26 is an elongate hole that is long along the hypothetical line and has a width corresponding to the diameter of a positioning pin. Thus, when the recording tape cartridge 10 is loaded into the drive device and the positioning pins are respectively inserted into the positioning holes 24 and 26, the recording tape cartridge 10 is accurately positioned in the horizontal direction (left and right, front and back) inside the drive device.

Moreover, the portions around the positioning holes 24 and 26 in the bottom plate 16A serve as positioning surfaces 24A and 26A that are finished more smoothly than the other portion (design surface) of the bottom plate 16A. The positioning surfaces 24A and 26A are configured to contact positioning surfaces of the drive device disposed around the positioning pins when the positioning pins are inserted into the positioning holes 24 and 26. Thus, the recording tape cartridge 10 is also positioned in the vertical direction inside the drive device.

Figure 10:
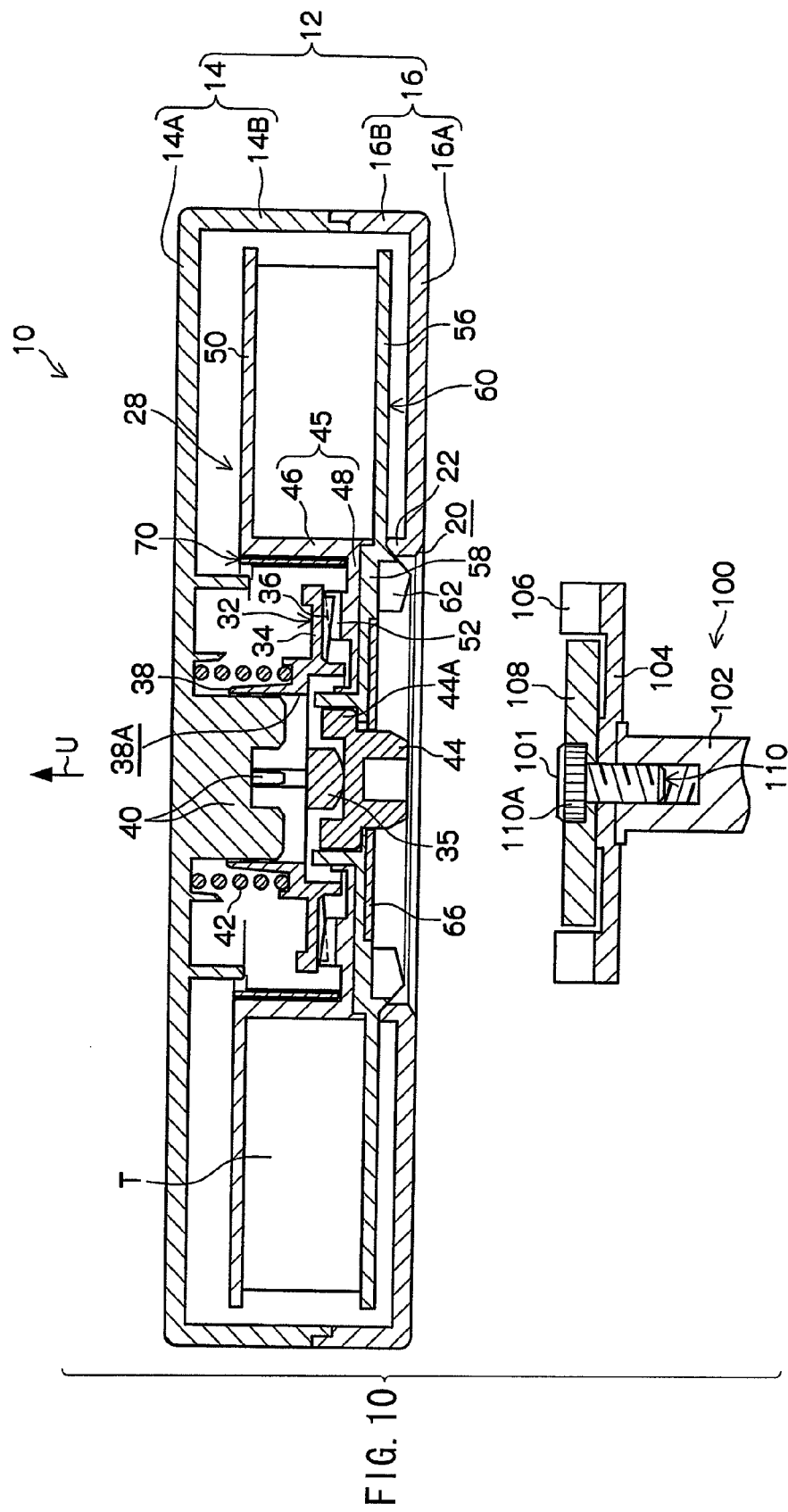
FIG. 10 is a cross-sectional diagram showing a state where rotation of the reel in the recording tape cartridge to which the reel and the reinforcement ring pertaining to the first embodiment of the invention have been applied is locked.

As shown in FIG. 10, the reel 28 that will be described in detail later is rotatably housed inside the case 12 that has been described above. Just one reel 28 is disposed. Magnetic tape T serving as recording tape is wound onto the reel 28, and a leader block 30 serving as a pullout member is attached to the leading end of the magnetic tape T.

The leader block 30 is housed and held inside the opening 18 in the case 12 when the recording tape cartridge 10 is not in use. In this state, the leader block 30 blocks the opening 18 and deters the ingress of dust and the like into the case 12. Further, an engagement concave portion 30A is formed in the leading end of the leader block 30, so that when the magnetic tape T is to be pulled out inside the drive device, the leader block 30 is extracted from the case 12 by pullout means that engages with the engagement concave portion 30A and is guided to a take-up reel of the drive device. The end surface of the leader block 30 on the opposite side of the engagement concave portion 30A serves as a circular arc surface 30B and is fitted into the take-up reel to configure part of a take-up surface that takes up the magnetic tape T.

Further, the recording tape cartridge 10 is disposed with a brake member 32 for deterring rotation of the reel 28 when the recording tape cartridge 10 is not in use. The brake member 32 has as its main parts a disc portion 34 formed in a disc shape, a brake gear 36 formed facing downward on the peripheral edge portion of the disc portion 34, a cross-shaped projection 38 disposed so as to project upward from the axial center portion of the disc portion 34, and a slide-contact projecting portion 35 disposed so as to project downward from the axial center portion of the disc portion 34. An insertion groove 38A formed in a substantial cross shape when seen in plan view is formed in the cross-shaped projection 38 in correspondence to the shape of the cross-shaped projection 38, and a cross-shaped rib 40 disposed facing down from the top plate 14A is inserted into the insertion groove 38A so as to be capable of relative motion (sliding motion) in the up and down direction. Thus, the brake member 32 is configured to be incapable of rotation with respect to the case 12 and capable of relative motion in the up and down direction.

The brake gear 36 of the brake member 32 meshes with an engagement gear 52 disposed in a bottom plate 48 configuring the reel 28 (these will be described later) to thereby prevent rotation of the reel 28 with respect to the case 12, and the brake member 32 moves in the up and down direction (axial line direction of the reel 28) with respect to the case 12 to thereby switch between a state where the brake gear 36 meshes with the engagement gear 52 and a state where the brake gear 36 disengages from the engagement gear 52. A compression coil spring 42 that energizes the brake member 32 toward the bottom plate 48 is disposed in the recording tape cartridge 10, and the brake gear 36 of the brake member 32 is always biased in a brake position where it is meshed with the engagement gear 52.

Further, the recording tape cartridge 10 is disposed with a clutch member 44 that penetrates the axial center portion of the bottom plate 48 of the reel 28 and is supported so as to be capable of coaxial and integral rotation with the reel 28, capable of relative displacement in the axial line direction with respect to the reel 28, and incapable of falling out. The clutch member 44 is pressed by the slide-contact projecting portion 35 of the brake member 32 whose brake gear 36 is meshed with the engagement gear 52, so that part of the clutch member 44 projects outside (below) the reel 28. The brake member 32 is configured such that, when the slide-contact projecting portion 35 is pressed upward, the brake member 32 moves upward and reaches a release position where the meshing between the brake gear 36 and the engagement gear 52 is released.

Figure 11:
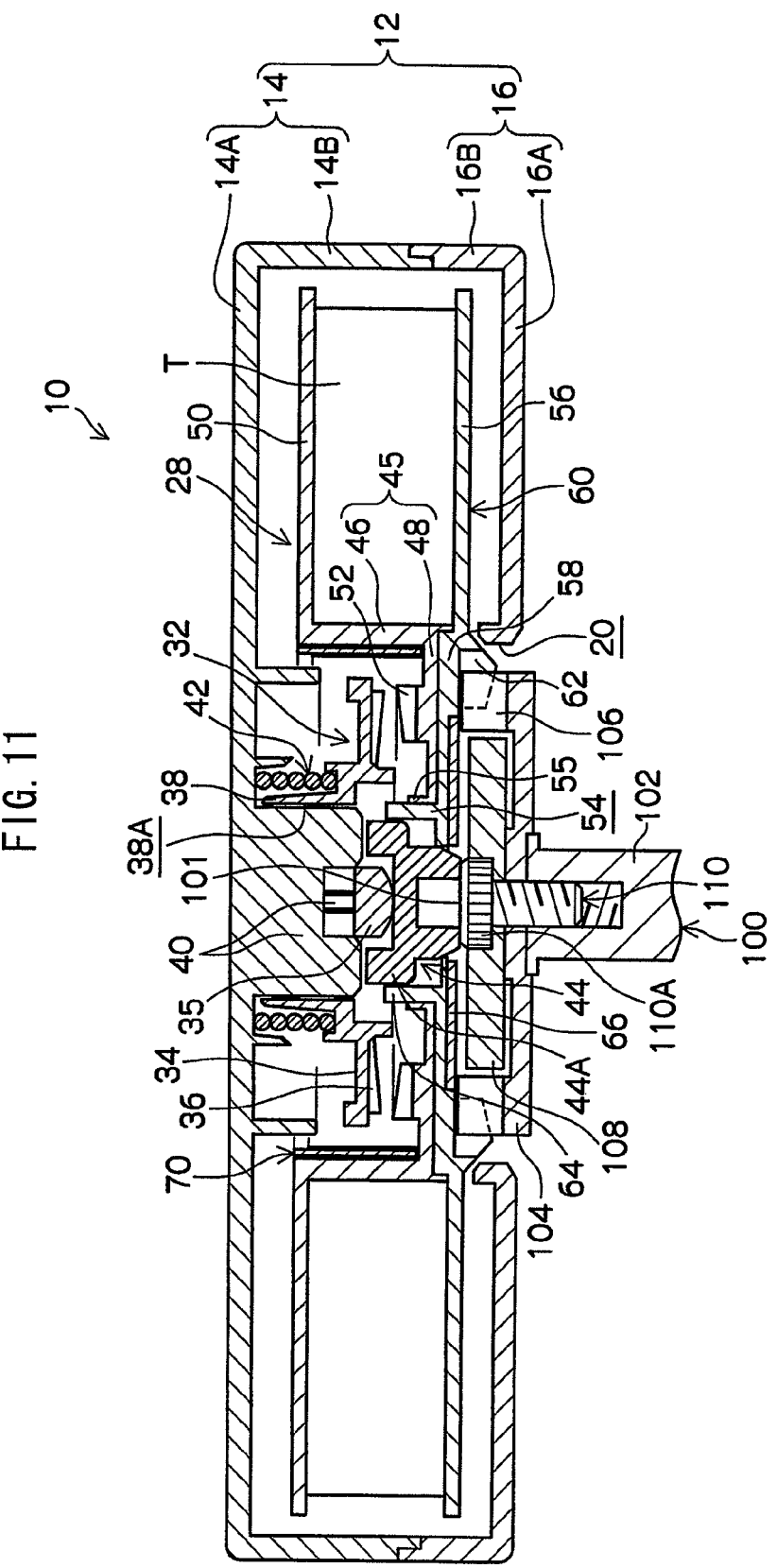
FIG. 11 is a cross-sectional diagram showing a state where rotation of the reel in the recording tape cartridge to which the reel and the reinforcement ring pertaining to the first embodiment of the invention have been applied is unlocked.

In this embodiment, the clutch member 44 is configured to be pressed upward by a release surface 101 disposed in the axial center portion of a rotating shaft 100 of the drive device and to thereby cause the brake member 32 to move from the brake position to the release position shown in FIG. 11.

To add more in regard to the rotating shaft 100, the rotating shaft 100 includes a rotating table 104 fixed to the upper end of a rotating axle 102, and a drive gear 106 capable of meshing with the reel gear 62 (described later) of the reel 28 is formed facing upward on the peripheral edge portion of the rotating table 104. Thus, the rotating shaft 100 is configured to move relatively upward with respect to the case 12 to thereby cause the drive gear 106 to mesh with the reel gear 62. Further, a disc-shaped magnet 108 is disposed on the radial direction inner side of the drive gear 106 on the rotating table 104, and the magnet 108 is fixed by a tap bolt 110 that penetrates the axial center portion of the magnet 108 and is screwed into the rotating axle 102. The aforementioned release surface 101 is configured by a head portion 110A of the tap bolt 110.

The recording tape cartridge 10 that has been described above is configured such that, during rotation of the reel 28 (when the magnetic tape T is being pulled out or taken up), relative rotation occurs between the slide-contact projecting portion 35 (the brake member 32) that does not rotate with respect to the case 12 and the clutch member 44 that rotates together with the reel 28, and the distal end (lower end) of the slide-contact projecting portion 35 and the upper surface of the clutch member 44 slide against each other because of this relative rotation.

(Configuration of Reel)

Figure 5:
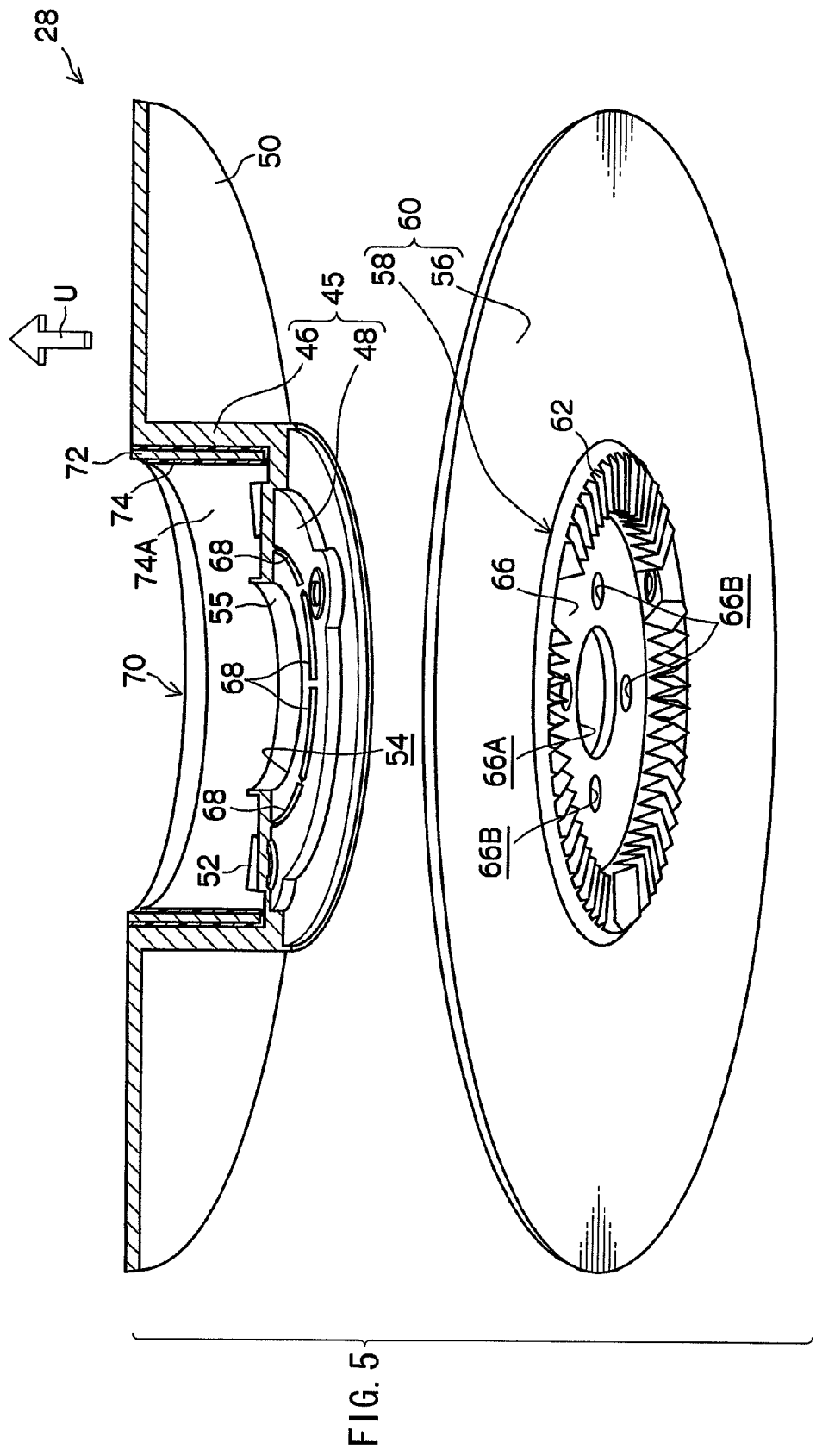
FIG. 5 is a partial cutaway exploded perspective diagram of a reel to which the reinforcement ring pertaining to the first embodiment of the invention has been applied.
Figure 6:
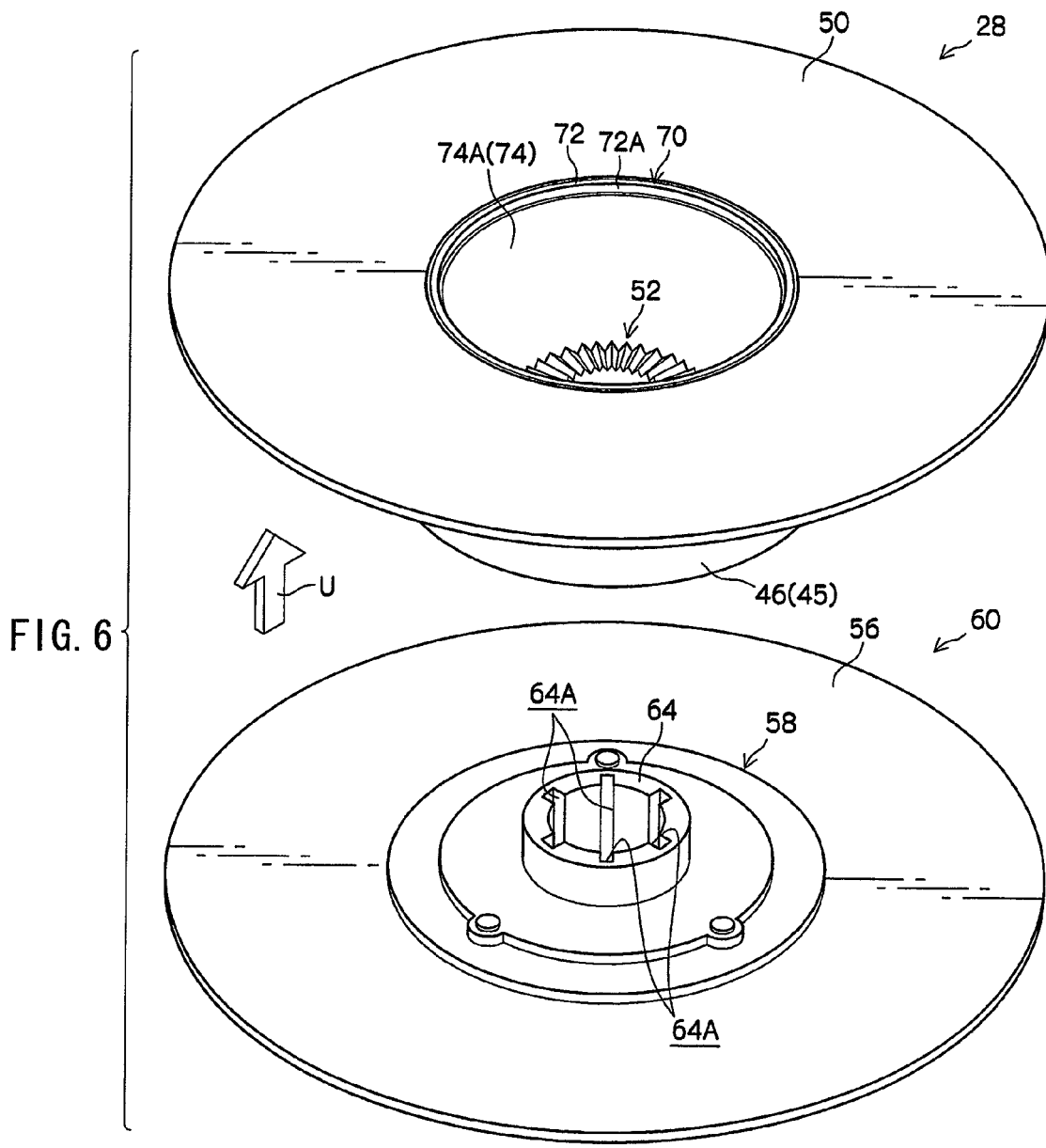
FIG. 6 is an exploded perspective diagram where the reel to which the reinforcement ring pertaining to the first embodiment of the invention has been applied is seen from a direction different from that of FIG. 5.
Figure 7:
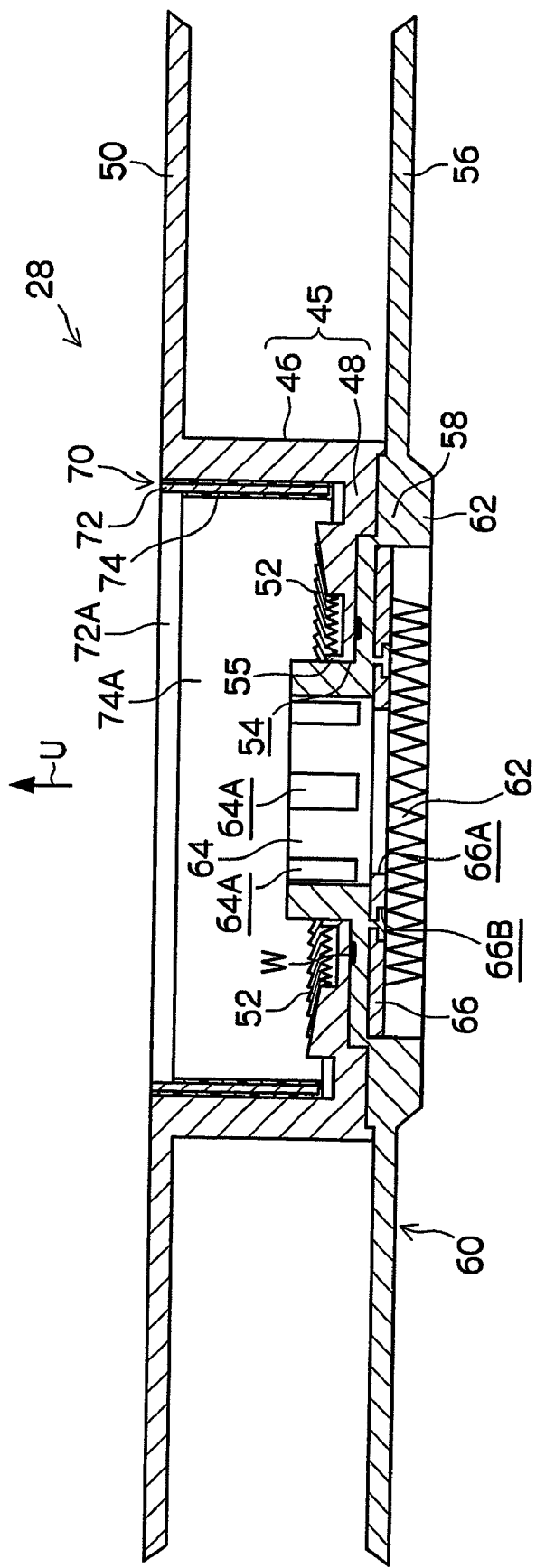
FIG. 7 is a cross-sectional diagram of the reel to which the reinforcement ring pertaining to the first embodiment of the invention has been applied.
Figure 8:
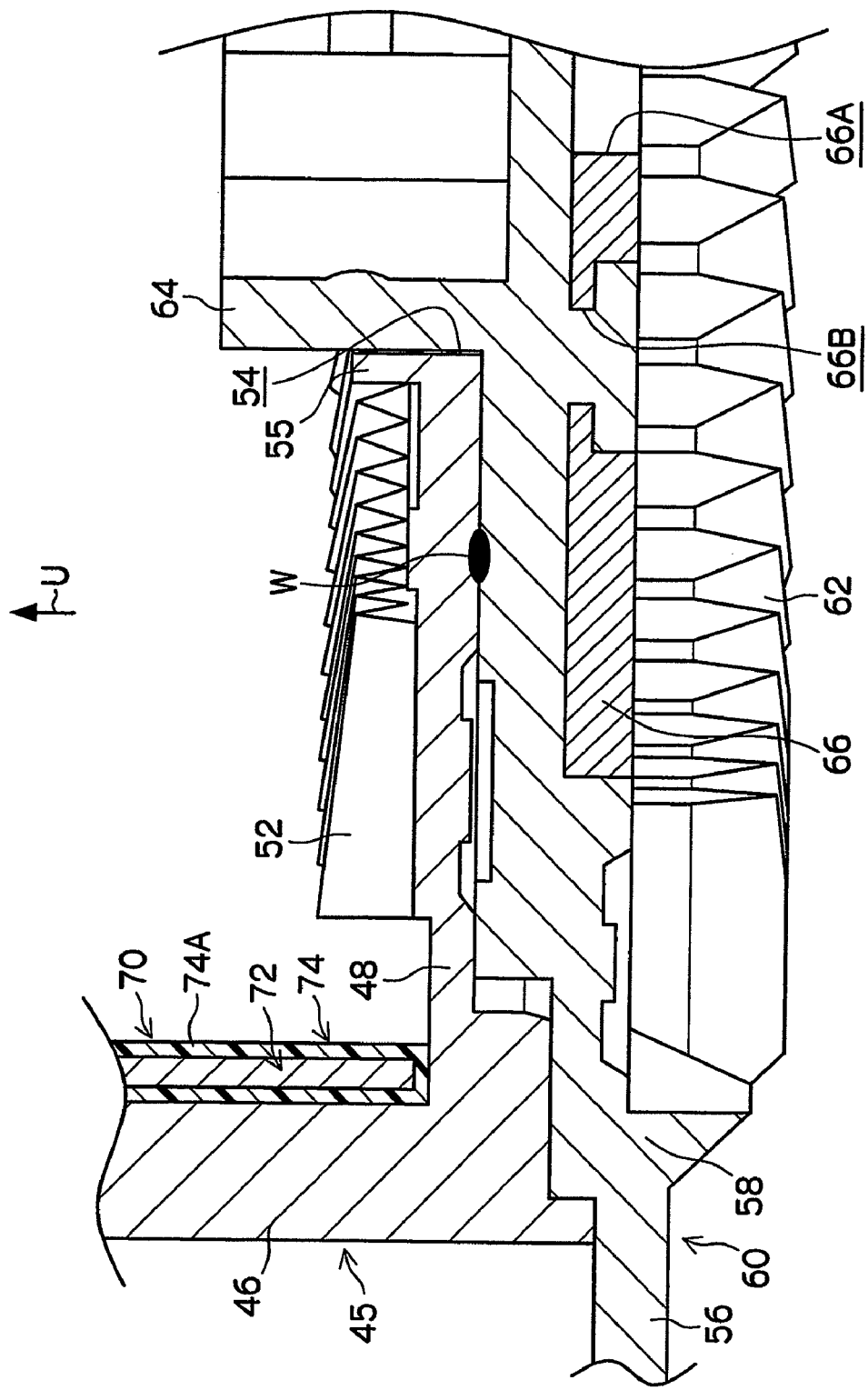
FIG. 8 is an enlarged cross-sectional diagram showing part of the reel to which the reinforcement ring pertaining to the first embodiment of the invention has been applied.

As shown in FIG. 5 to FIG. 7, the reel 28 is disposed with a reel hub 45 that configures the axial center portion of the reel 28. The reel hub 45 is formed in a substantially bottomed circular cylinder shape including a circular cylinder wall 46 whose outer peripheral surface serves as a tape take-up surface 46A for winding the magnetic tape T and a bottom plate 48 that blocks the lower portion of the circular cylinder wall 46. An upper flange 50 is disposed so as to extend coaxially and integrally outward in the radial direction from the upper end of the circular cylinder wall 46 of the reel hub 45.

Further, the engagement gear 52 capable of meshing with the brake gear 36 of the brake member 32 is formed facing upward in the bottom plate 48 of the reel hub 45. That is, as described above, the engagement gear 52 is configured to mesh with the brake gear 36 of the brake member 32 positioned in the brake position and disengage from the brake gear 36 of the brake member 32 positioned in the release position to allow rotation about the axis of the reel 28. In this embodiment, the engagement gear 52 is formed such that its teeth are disposed annularly when seen in plan view.

Moreover, a through hole 54 that penetrates the bottom plate 48 in the plate thickness direction is formed in the axial center portion of the bottom plate 48 of the reel hub 45 and is configured to be able to allow part of the clutch member 44 to project therefrom. A short circular cylinder portion 55 serving as a cylindrical portion is disposed facing upward upright from the peripheral edge portion of the through hole 54 in the bottom plate 48. The short circular cylinder portion 55 is formed integrally with the reel hub 45, and it is possible to understand that the short circular cylinder portion 55 has a turn-back shape with respect to the circular cylinder wall 46.

Excluding the reinforcement ring 70 that will be described later, each portion of the reel hub 45 described above that has as its main portions the circular cylinder wall 46, the bottom plate 48, the engagement gear 52 and the short circular cylinder portion 55 is formed integrally by resin molding.

Further, a shown in FIG. 5 to FIG. 7, the reel 28 includes a lower flange 56 that faces the upper flange 50. The lower flange 56 is disposed so as to extend integrally outward in the radial direction from a center portion 58 that is joined together (this joint structure will be described later) with the bottom plate 48 of the reel hub 45, and the lower flange 56 is fixedly held to the reel hub 45 via this center portion 58. A lower flange member 60 serving as a flange member is configured by the lower flange 56 and the center portion 58.

The reel gear 62 capable of meshing with the drive gear 106 of the rotating shaft 100 of the drive device is formed facing downward in the center portion 58 of the lower flange member 60. The reel gear 62 is configured overall such that its plural teeth are arrayed so as to form an annular shape that is coaxial with the lower flange member 60—that is, the reel 28. It will be noted that the reel gear 62 may also be configured to include a region where teeth are not formed in part of its circumferential direction.

Further, as shown in FIG. 6 and FIG. 7, a clutch-use boss portion 64 for supporting the clutch member 44 is disposed facing upward upright from the axial center portion of the center portion 58. The clutch-use boss portion 64 is formed in a circular cylinder shape, is configured such that slits 64A that allow plural engagement pieces 44A projecting radially from the upper portion of the clutch member 44 to enter are formed in its cylinder wall, and supports the clutch member 44 such that the clutch member 44 is capable of sliding in the axial line direction and is incapable of relative rotation and incapable of falling out at each slide position. The clutch-use boss portion 64 is configured such that its outer diameter substantially coincides with the inner diameter of the through hole 54—that is, the short circular cylinder portion 55—and to fit together with the short circular cylinder portion 55.

Each portion of the lower flange member 60 described above that has as its main portions the lower flange 56, the center portion 58, the reel gear 62 and the clutch-use boss portion 64 is formed integrally by resin molding.

Moreover, as shown in FIG. 5 to FIG. 7, a reel plate 66 serving as a metal plate comprising a magnetic body is fixedly disposed in the center portion 58. The reel plate 66 is formed in a substantial disc shape having a clear hole 66A in its axial center portion and is disposed coaxially on the radial direction inner side of the reel gear 62. The reel plate 66 is configured to be attracted by magnetic force to, but without contacting, the rotating table 104 of the rotating shaft 100 of the drive device.

The reel plate 66 is fixed to the center portion 58—that is, the lower flange member 60—by insert molding. Specifically, plural (in the present embodiment, four) small holes 66B disposed at equidistant intervals in the circumferential direction along a hypothetical circle coaxial with the clear hole 66A are formed in the reel plate 66 so as to penetrate the reel plate 66 in the plate thickness direction. The portion of each of the small holes 66B on the underside of the reel plate 66 serves as an enlarged diameter portion to configure a so-called pillbox shape. The reel plate 66 is strongly fixed to the lower flange member 60 as a result of a resin material that has been injected into a mold and filled each of the small holes 66B cooling and solidifying. It will be noted that the reel plate 66 may also have a structure where it is fixed to the lower flange member 60 by caulking or the like.

In the reel 28 that has been described above, the lower flange member 60 is, as described above, joined together with the bottom plate 48 of the reel hub 45 at the lower flange 56. Specifically, in this embodiment, as shown in FIG. 5, welding-use projections (energy directors) 68 are disposed so as to project from the undersurface of the bottom plate 48, and ultrasonic oscillation is applied in a state where the welding-use projections 68 have been brought into contact with the upper surface of the center portion 58, whereby the reel hub 45 and the lower flange member 60 are ultrasonically welded together at the portions where the welding-use projections 68 are disposed. These welding sites are indicated by letter W in FIG. 8. From this diagram, it will be understood that the reel hub 45 and the lower flange member 60 are joined together inside the region where the reel plate 66 is disposed.

Further, in this embodiment, as shown in FIG. 5 to FIG. 8, the reel 28 is disposed with the reinforcement ring 70 serving as an insert body that is fitted inside the circular cylinder wall 46 of the reel hub 45. This reinforcement ring 70 will be described below.

(Configuration of Reinforcement Ring)

In FIG. 1A, there is shown a perspective view in a state where the reinforcement ring 70 has been cut substantially in half, and in FIG. 1B, there is shown a front view in a state where the reinforcement ring 70 has been cut substantially in half. As shown in these drawings, the reinforcement ring 70 is configured as a result of a metal ring 72 being covered by a resin layer 74.

Specifically, the metal ring 72 is formed in a short circular cylinder shape whose outer diameter is slightly smaller than the inner diameter of the circular cylinder wall 46 of the reel hub 45 and whose height (axial direction length) is substantially equivalent to that of the circular cylinder wall 46, and is configured by a metal material. In this embodiment, the metal ring 72 is configured by a drawn material of an aluminium alloy or aluminium. In this embodiment, the metal ring 72 uses aluminium whose elastic limit is substantially 230 MPa to 320 MPa and whose tensile strength is substantially 280 MPa to 390 MPa. Further, the metal ring 72 is configured such that its thickness is substantially 0.5 mm to 1.5 mm and its height (axial line direction length) is substantially 11.0 mm to 13.5 mm with respect to the magnetic tape T whose tape width is 12.65 mm. The height of the metal ring 72 is sufficiently smaller with respect to the diameter of the metal ring 72 and is slightly smaller than the height of the inner surface side of the circular cylinder wall 46 configuring the reel hub 45. The material strength and dimensions of the metal ring 72 (strength portion of the reinforcement ring 70) are determined in consideration of the rigidity and strength of (the reinforcement ring 70 that reinforces) the reel hub 45 that are necessary in order to keep changes in the tape width of the magnetic tape T (changes after being stored for one week in an environment whose atmospheric temperature is 40° C. and whose relative humidity is 80%) that is 12.65 mm as described above to 900 ppm or less. That is, by configuring the material, width and height of the metal ring 72 to be the material, width and height described above, changes in the tape width dimension under the above-described environment are set to become 900 ppm or less. It will be noted that the thickness and height of the metal ring 72 are appropriately set within the above-described ranges in accordance with the wound amount, winding pressure and wound diameter of the magnetic tape T.

The resin layer 74 covers the metal ring 72 across substantially its entire surface excluding part of one axial direction end of the metal ring 72. In this embodiment, the metal ring 72 is covered by the resin layer 74 excluding an upper end portion 72A in a state where the metal ring 72 has been attached to the reel hub 45. That is, the resin layer 74 is configured to include an inner cover layer 74A that covers the inner peripheral surface of the metal ring 72 excluding the upper end portion 72A, an outer cover layer 74B that covers the outer peripheral surface of the metal ring 72 across substantially the entire surface, and a lower cover layer 74C that covers a lower end surface 72B of the metal ring 72.

Figure 2A:
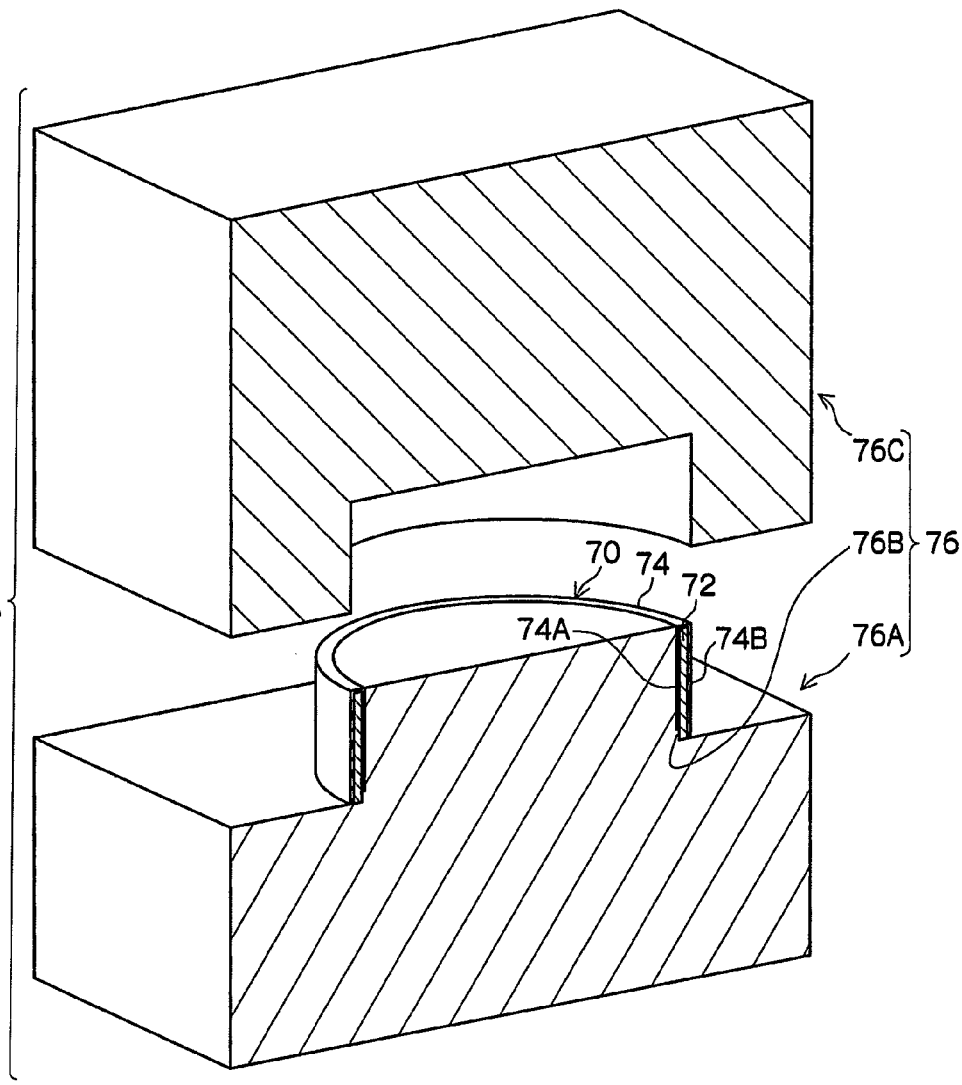
FIGS. 2A and 2B are diagrams showing the structure of a mold for manufacturing the reinforcement ring pertaining to the first embodiment of the invention, with FIG. 2A being a halved perspective diagram and FIG. 2B being an enlarged cross-sectional diagram showing part of the mold.
Figure 2B:
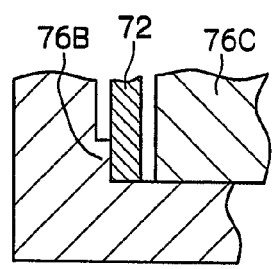

The metal ring 72 and the resin layer 74 of the reinforcement ring 70 are integrally configured by insert molding. Specifically, as shown in FIG. 2A, the metal ring 72 is set in a preparation mold 76, and in this state, the mold 76 is filled with resin material and the resin material is allowed to cool and solidify, whereby the resin layer 74 is formed. That is, the metal ring 72 is formed by injection molding. In this embodiment, as shown in FIG. 2B, the upper end portion 72A of the metal ring 72 is fitted together with and positioned against a step portion 76B formed in a movable mold 76A, and the movable mold 76A in this state is set in a fixed mold 76C and embedded in the resin material filling the preparation mold 76. For this reason, the inner cover layer 74A has the above-described configuration where it does not cover the upper end portion 72A of the metal ring 72. It will be noted that the portion (the upper end portion 72A) of the metal ring 72 that fits together with the step portion 76B is set to be as short as possible in a range that ensures desired positioning precision.

The roundness of the inner cover layer 74A of the resin layer 74—that is, the reinforcement ring 70—formed as described above is 50 μm or less. The roundness of the inner cover layer 74A is preferably 50 μm or less and more preferably 30 μm in consideration of the fact that the roundness of a later-described mold (a movable mold 78A) for molding the reel hub 45 (the circular cylinder wall 46) is several μm. It will be noted that the roundness in the present embodiment is a roundness determined by JISB0621-1984 and uses semi-diameter correction of two circles from a center point determined by the least square center method.

Figure 3:
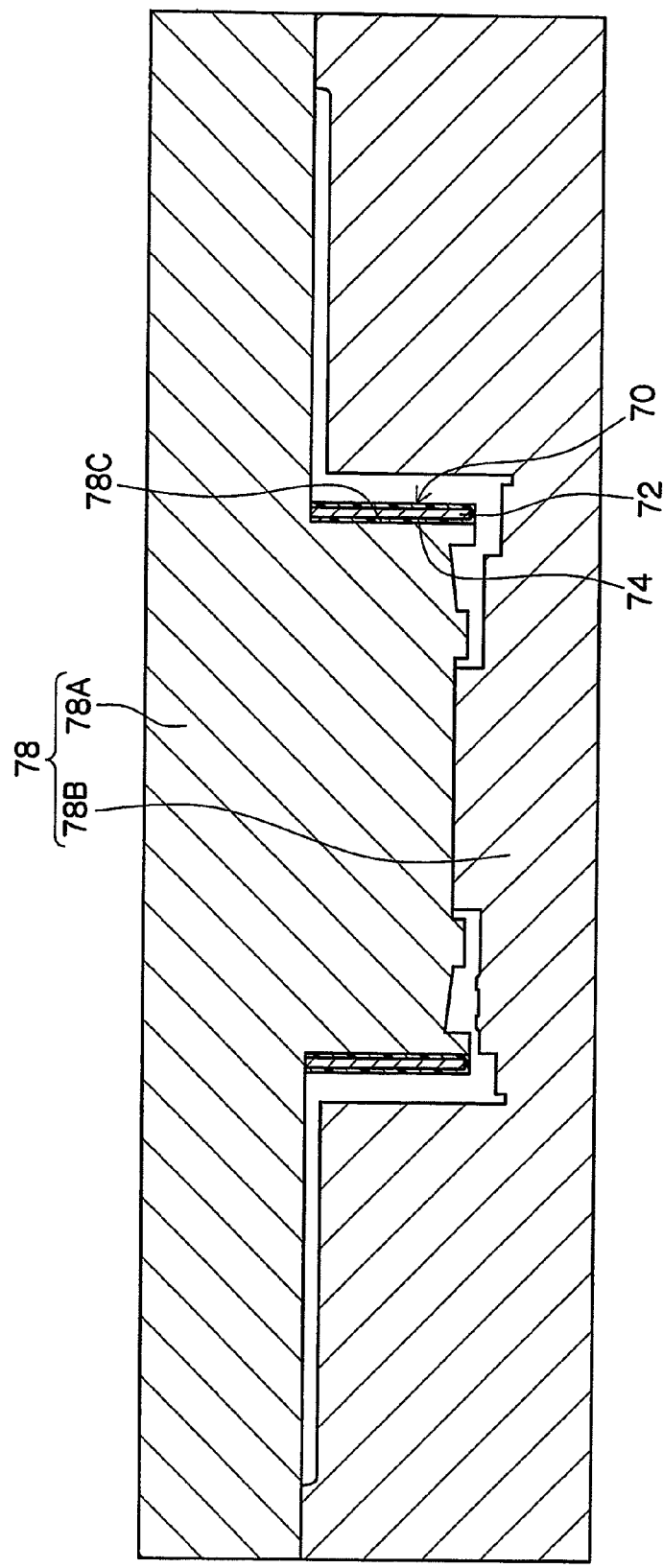
FIG. 3 is a cross-sectional diagram showing the structure of a mold for insert-molding the reinforcement ring pertaining to the first embodiment of the invention to a reel hub.
Figure 4:
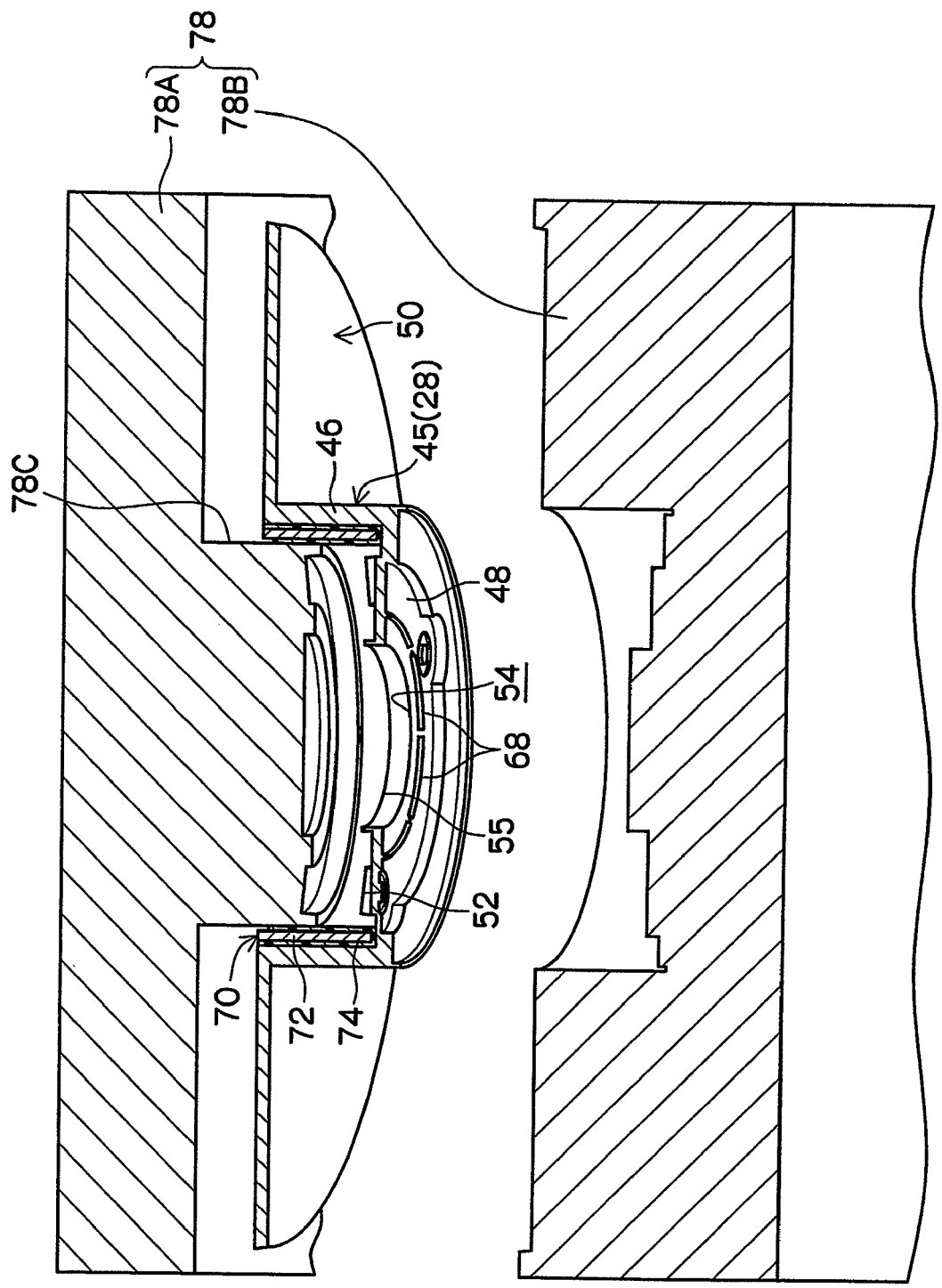
FIG. 4 is a halved perspective diagram showing the mold and the reel hub to which the reinforcement ring pertaining to the first embodiment of the invention has been insert-molded.

Additionally, the reinforcement ring 70 is integrated with the reel hub 45 (the reel 28) by insert molding. Specifically, as shown in FIG. 3, in a state where the reinforcement ring 70 has been set in a movable mold 78A configuring a forming mold for molding the reel hub 45 together with the upper flange 50, the reinforcement ring 70 is embedded in a resin material filling the space between the movable mold 78A and a fixed mold 78B (the forming mold 78), and when this resin material cools and solidifies, the reinforcement ring 70 is integrated with (fixedly held to) the reel hub 45 as shown in FIG. 4 to configure part of the reel 28. In this embodiment, the clearance between the inner cover layer 74A of the resin layer 74 and a peripheral surface 78C of the movable mold 78A is set to be 30 μm or less in the state shown in FIG. 3 where the reinforcement ring 70 has been set in the forming mold 78.

Next, the action of the present first embodiment will be described (see FIG. 9 and FIG. 10).

When the recording tape cartridge 10 of the above-described configuration is not in use, the brake member 32 is positioned in the rotation lock position and the brake gear 36 is caused to mesh with the engagement gear 52 by the energizing force of the compression coil spring 42. For this reason, rotation of the reel 28 with respect to the case 12 is deterred. At this time, the reel gear 62 of the reel 28 is exposed from the gear opening 20, and the lower portion of the clutch member 44 projects from the clutch-use boss portion 64 and is exposed at the gear opening 20.

When the magnetic tape T is to be used, the recording tape cartridge 10 is loaded into a bucket (not shown) of the drive device along the direction of arrow A. Then, when the recording tape cartridge 10 is loaded a predetermined depth into the bucket, the bucket moves downward so that the rotating shaft 100 of the drive device relatively approaches (moves upward) the gear opening 20 in the case 12 and holds the reel 28. Specifically, the rotating shaft 100 attracts and holds, but does not contact, the reel plate 66 with the magnet 108 and causes the drive gear 106 to mesh with the reel gear 62.

In accompaniment with the drive gear 106 meshing with the reel gear 62, that is, the relative movement of the rotating shaft 100 in its axial direction toward the case 12, the rotating shaft 100 presses upward the clutch member 44 that it is contacting at its release surface 101. Then, because of this pressing force, the clutch member 44 is guided in the slits 64A of the clutch-use boss portion 64 at its plural engagement pieces 44A and moves upward in the axial line direction of the reel 28 counter to the energizing force of the compression coil spring 42. Thus, the brake member 32 contacting the upper surface of the clutch member 44 at its slide-contact projecting portion 35 also moves upward, and the meshing between the brake gear 36 of the brake member 32 and the engagement gear 52 is released. That is, the brake member 32 reaches a relative rotation allowance position with respect to the reel 28. When the rotating shaft 100 further relatively moves upward, the reel 28 is lifted upward (without its relative position being caused to change) together with the clutch member 44 and the brake member 32 counter to the energizing force of the compression coil spring 42, the brake member 32 reaches an absolute (with respect to the case 12) rotation allowance position, and the lower flange 52 separates from the annular rib 22 (a tapered surface 22A). Due to the above, the reel 28 rises inside the case 12 and becomes rotatable without contacting the inner surface of the case 12.

Further, due to the lowering of the bucket, that is, the recording tape cartridge 10 inside the drive device, the positioning pins of the drive device respectively enter the positioning holes 24 and 26 in the case 12, and the positioning surfaces of the drive device come into contact with the positioning surfaces 24A and 26A of the case 12. Thus, the recording tape cartridge 10 is positioned in the horizontal direction and the vertical direction with respect to the drive device. Then, the pullout means of the drive device causes a pullout pin (not shown) to engage with the engagement concave portion 30A of the leader block 30, pull out the leader block 30 from the case 12, and guide the leader block 30 to the take-up reel of the drive device. Moreover, the leader block 30 is fitted into the take-up reel to configure part of the take-up surface that takes up the magnetic tape T.

In this state, when the leader block 30 rotates integrally with the take-up reel, the magnetic tape T is pulled out from the case 12 through the opening 18 while being taken up onto a reel hub of the take-up reel. At this time, the reel 28 of the recording tape cartridge 10 rotates synchronously with the take-up reel by the rotational force of the rotating shaft 100 that is transmitted by the drive gear 106 meshing with the reel gear 62. Then, a recording and playback head disposed along a predetermined tape path of the drive device records information to the magnetic tape T or plays back information that has been recorded on the magnetic tape T. At this time, the slide-contact projecting portion 35 of the brake member 32 that is incapable of rotation with respect to the case 12 slidingly contacts the upper surface of the clutch member 44 that rotates with respect to the case 12 together with the reel 28.

When the magnetic tape T is to be rewound onto the reel 28 and the leader block 30 is to be held in the vicinity of the opening 18 in the case 12, the bucket into which the recording tape cartridge 10 has been loaded is caused to rise. Then, the meshing between the reel gear 62 and the drive gear 106 is released, the contact between the release surface 101 and the clutch member 44 is released, and the clutch member 44 moves downward together with the brake member 32 by the energizing force of the compression coil spring 42. Thus, the brake member 32 returns to the brake position where the brake gear 36 meshes with the engagement gear 52. Further, in accompaniment with operation where the brake member 32 and the clutch member 44 move by the energizing force of the compression coil spring 42, the reel 28 also moves downward and returns to its initial state where the lower flange 56 is brought into contact with the annular rib 22 and the reel gear 62 is exposed from the gear opening 20. In this state, the recording tape cartridge 10 is ejected from the bucket.

Here, in the recording tape cartridge 10 disposed with the reel 28, the circular cylinder wall 46 of the reel hub 45 is supported (reinforced) in its radial direction by the reinforcement ring 70, so deformation of the circular cylinder wall 46 resulting from the winding pressure of the magnetic tape T is controlled. For this reason, the magnetic tape T is prevented from unevenly deforming (partially widening) in its width direction in accompaniment with deformation of the circular cylinder wall 46, a change in the tracking position with respect to a reference edge of the magnetic tape T is controlled, and recording errors and playback errors can be prevented from occurring. In this embodiment, it was confirmed that deformation (a change in the inner diameter) of the reel hub 45 resulting from the winding pressure of the magnetic tape T was kept to 0.01 mm or less. Thus, the aforementioned change in the dimension of the tape width of the magnetic tape T is kept to 900 ppm or less. Further, it was confirmed that, because of this control of the deformation of the circular cylinder wall 46 (the reel hub 45), deformation of the upper flange 50 (displacement of the outer peripheral edge portion in the axial line direction of the reel hub) that is formed integrally with the reel hub 45 was kept to 0.05 mm or less.

Additionally, because the reinforcement ring 70 is configured as a result of the resin layer 74 being disposed on the metal ring 72, the clearance between the inner cover layer 74A and the peripheral surface 78C of the movable mold 78A can be set small in comparison to when the reinforcement ring is configured by a simple metal circular cylinder. That is, when the reinforcement ring is configured by a metal circular cylinder, the metal comprising the metal circular cylinder contacts the metal comprising the mold, which reduces the lifespan of the mold and causes damage to the reinforcement ring, and a clearance of at least about 50 μm becomes necessary as a measure to counter these drawbacks. On the other hand, when the clearance is widened, the molding resin flows into this clearance and also causes a deterioration in yield.

In contrast, the reinforcement ring 70 is disposed with the inner cover layer 74A made of resin, so there is little impact on the lifespan of the mold, damage is also alleviated, and as described above, the clearance between the inner cover layer 74A and the peripheral surface 78C of the movable mold 78A can be set small. In this embodiment, this clearance is 30 μm or less, and the reinforcement ring 70 can be precisely integrated with respect to the circular cylinder wall 46 of the reel hub 45. More specifically, the amount of eccentricity between the reinforcement ring 70 (the metal ring 72) and the reel hub 45 can be reduced.

Further, although the roundness of the metal ring 72 that is a drawn material of an aluminium alloy or aluminium is about 100 μm, making the roundness of the entire reinforcement ring 72 to be 50 μm or less can be easily realized without requiring secondary working such as machining by disposing the resin layer 74 on the metal ring 72 by injection (insert) molding. Thus, a situation where the molding resin flows between the partially wide gap between the peripheral surface 78C of the movable mold 78A and the reinforcement ring 70 such that the yield deteriorates, and for which there is a concern when a reinforcement ring configured by a drawn material of metal is used, is prevented.

That is, the reinforcement ring 70 has a configuration where the resin layer 74 is disposed on the metal ring 72, whereby its dimensional precision (roundness) can be improved. For this reason, a configuration using a drawn material of an aluminium alloy or aluminium that is inexpensive and lightweight as the metal ring 72 can be realized. Further, because the roundness of the reinforcement ring 70 is 50 μm or less, the supporting surface pressure of the reinforcement ring 70 is equalized at each portion. That is, in a configuration where the roundness of the reinforcement ring 70 is low, there are large variations in the thickness of the resin layer 74 and there is concern that differences will arise in the surface pressure capable of support when the tape winding pressure acts between the thick portion and the thin portion of the resin layer 74, but because the roundness of the resin layer 74—that is, the reinforcement ring 70—covering the metal ring 72 whose roundness is 100 μm is 50 μm or less, the supporting surface pressure of the reinforcement ring 70 is equalized at each portion. Particularly when the roundness of the reinforcement ring 70 is 50 μm or less, the supporting surface pressure of the reinforcement ring 70 is further equalized at each portion.

Further, in the reel 28, a structure is employed where the circular cylinder wall 46 is reinforced by the reinforcement ring 70, so that various types of restrictions in terms of design and manufacturing when the rigidity of the circular cylinder wall 46 is to be improved by another structure are avoided. Specifically, in a configuration where a filler such as carbon fiber (CF) or glass fiber (GF), for example, is mixed in with the resin in order to improve the rigidity of the circular cylinder wall 46, there is a limit in terms of molding (20% to 30% with respect to the resin), in a configuration where the thickness of the circular cylinder wall 46 is raised, holding pressure during molding decreases and it becomes difficult to ensure the surface precision of the tape take-up surface 46A, and when the difference in thickness with the upper flange 50 is large, this causes (no-load) surface runout accompanying molding. Moreover, in a configuration where a rib straddling the bottom plate 48 is disposed on the inner surface side of the circular cylinder wall 46, uneven shrinkage arises in the rear side of the rib at the tape take-up surface 46A, which lowers the roundness and worsens overall runout. In contrast to these, the reel 28 where the circular cylinder wall 46 is reinforced by the reinforcement ring 70 is freed from the various types of restrictions described above.

Moreover, in the recording tape cartridge 10 disposed with this reel 28, uneven deformation in the width direction of the magnetic tape T resulting from the winding constriction of the circular cylinder wall 46 is controlled as described above, so recording errors and playback errors can be inexpensively prevented in comparison to when a countermeasure is administered on the part of the magnetic tape T, and when a countermeasure on the part of the magnetic tape T is jointly implemented, recording errors and playback errors can be more reliably prevented. In other words, recording errors and playback errors resulting from uneven deformation in the width direction of the magnetic tape T can be prevented with respect also to an increase in the winding pressure of the magnetic tape T accompanying a further enlargement of its recording capacity.

Next, a reinforcement ring 80 serving as an insert body pertaining to a second embodiment of the present invention will be described on the basis of FIGS. 12A and 12B. It will be noted the same reference numerals as in the first embodiment will be given to parts and portions that are basically the same as those in the first embodiment and that description of those parts and portions will be omitted.

Figure 12A:
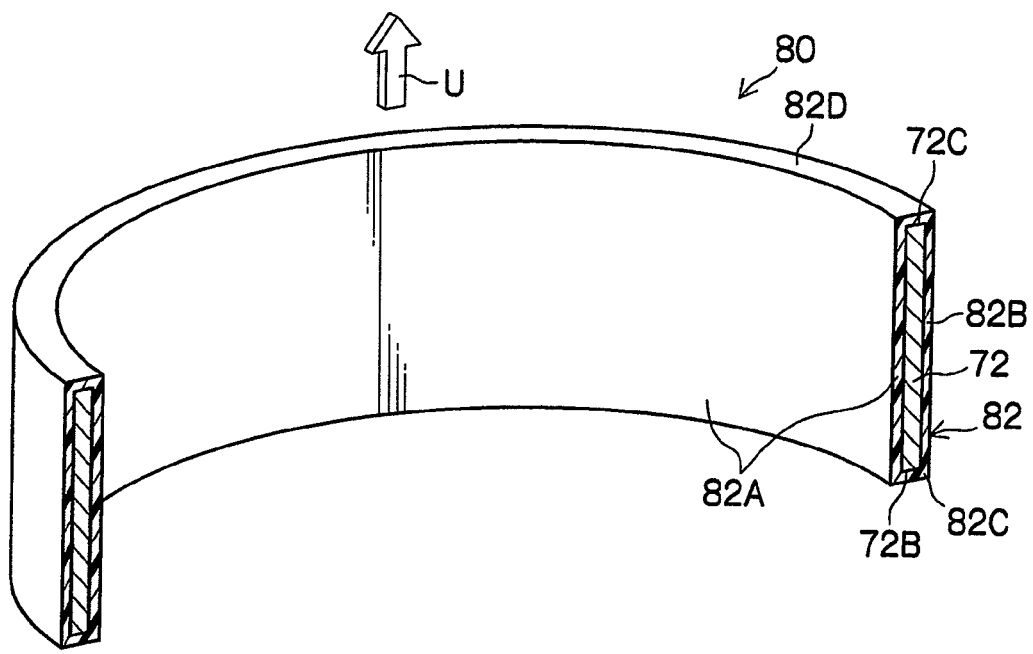
FIGS. 12A and 12B are diagrams showing a reinforcement ring pertaining to a second embodiment of the invention that has been cut substantially in half, with FIG. 12A being a perspective diagram and FIG. 12B being a front diagram.
Figure 12B:
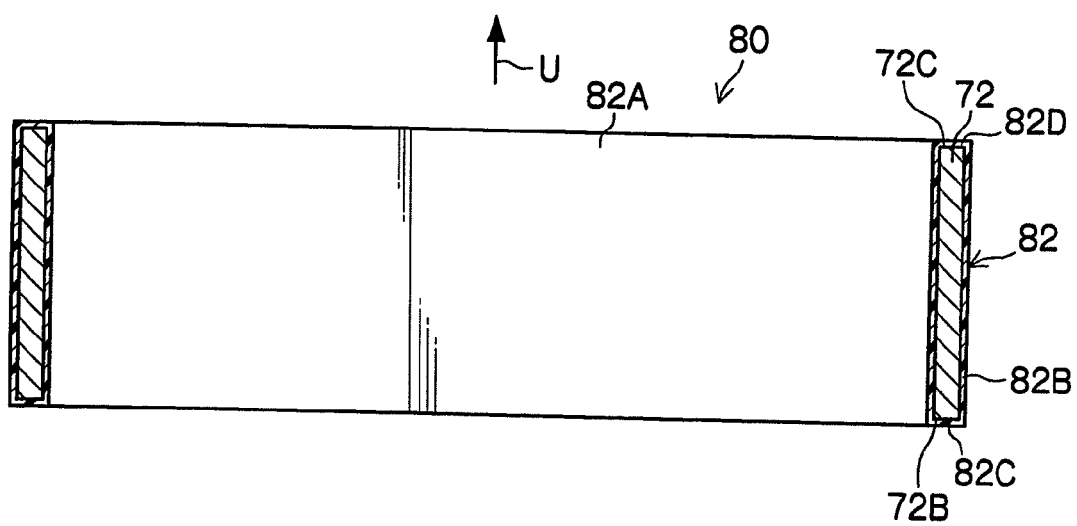
Figure 13:
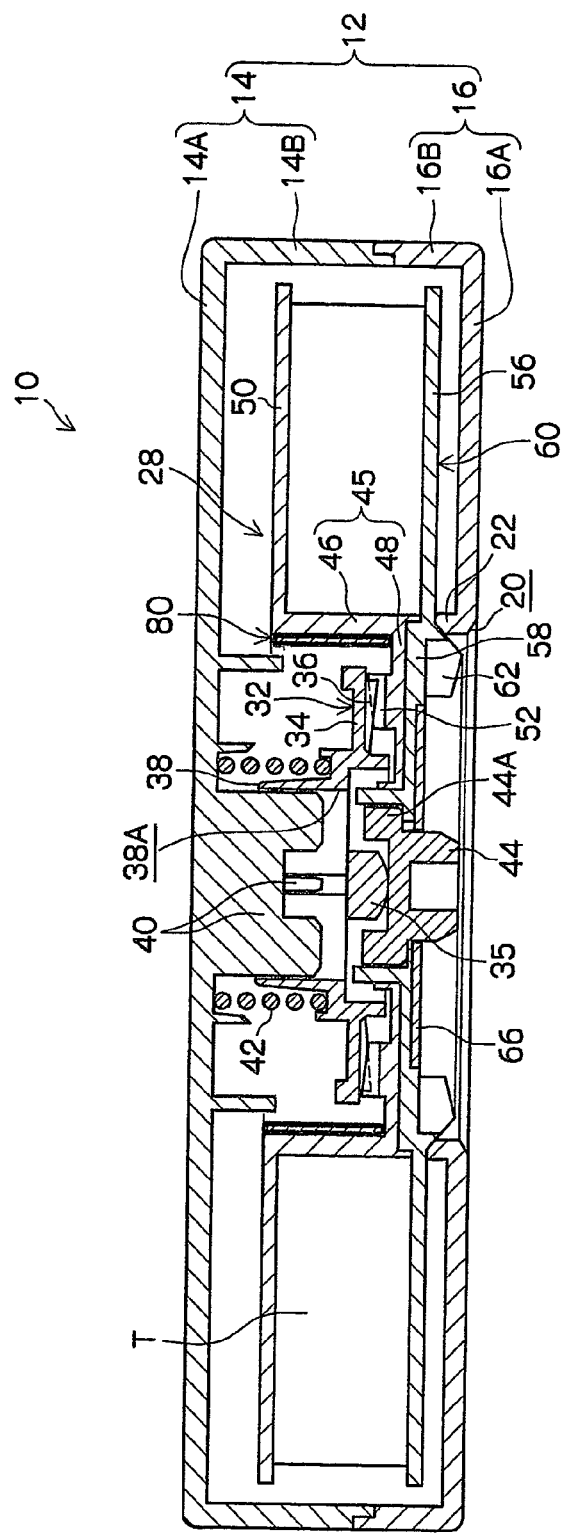
FIG. 13 is a cross-sectional diagram showing the recording tape cartridge to which the reel and the reinforcement ring pertaining to the second embodiment of the invention have been applied.

In FIG. 12A, there is shown a perspective diagram in a state where the reinforcement ring 80 has been cut substantially in half, and in FIG. 12B, there is shown a front diagram in a state where the reinforcement ring 80 has been cut substantially in half. As shown in these drawings, the reinforcement ring 80 is different from the reinforcement ring 70, where the upper end portion 72A of the metal ring 72 is exposed at its inner surface side and upper end side, in that the reinforcement ring 80 is configured as a result of the metal ring 72 being covered across its entire surface by a resin layer 82.

That is, the resin layer 82 is configured to include an inner cover layer 82A that covers the inner peripheral surface of the metal ring 72 across substantially the entire surface, an outer cover layer 82B that covers the outer peripheral surface of the metal ring 72 across substantially the entire surface, a lower cover layer 82C that covers the lower end surface 72B of the metal ring 72, and an upper cover layer 82D that covers an upper end surface 72C of the metal ring 72.

This resin layer 82 is disposed on the metal ring 72 by coating or the like, for example. Further, machining such as cutting may also be administered to the resin after the metal ring 72 has been coated with the resin to improve the precision of the resin layer 82.

According to the reinforcement ring 80 pertaining to the second embodiment also, the resin layer 82 (the inner cover layer 82A) is disposed on the metal ring 72, so basically the same effects can be obtained by action that is the same as that of the reinforcement ring 70 pertaining to the first embodiment. Further, the reel 28 to which the reinforcement ring 80 is applied and the recording tape cartridge 10 to which this reel 28 is applied can basically obtain the same effects by action that is the same as that of the reel 28 to which the reinforcement ring 70 pertaining to the first embodiment is applied and the recording tape cartridge 10 to which this reel 28 is applied.

In each of the preceding embodiments, an example was described where the reel hub 45 was formed integrally with the upper flange 50 and where the lower flange member 60 including the lower flange 56 was joined to the reel hub 45, but the present invention is not limited to this; the reinforcement rings 70 and 80 pertaining to the embodiments of the present invention can be applied to reels having various types of structures. Consequently, the invention may be applied to a configuration where the lower flange 56, the reel gear 62 and the clutch-use boss portion 64 are integrated with the reel hub 45, a configuration where the lower flange 56 and the upper flange 50 are both bodies separate from the reel hub 45, and a configuration that is not disposed with one or both of the upper flange 50 and the lower flange 56.

Further, in each of the preceding embodiments, an example was described where the metal ring 72 was configured by a drawn material of an aluminium alloy or aluminium, but the present invention is not limited to this; the metal ring 72 can be configured using various types of metal materials.

Moreover, in each of the preceding embodiments, an example was described where the roundness of the metal ring 72 was about 100 μm or less, but the present invention is not limited to this; for example, the roundness of the metal ring 72 may also be 50 μm or less or 30 μm or less. In these cases, the metals comprising the preparation mold 76 and the metal ring 72 can be prevented from contacting (interfering with) each other. Consequently, in the present embodiment, it becomes possible to further equalize the support surface pressure resulting from the reinforcement ring 70 because the clearance between the preparation mold 76 and the metal ring 72 can be set small and variations in the thickness of the resin layer 74 can be reduced. Further, because the roundness of the reinforcement ring 70 is further improved (e.g., 10 μm or less) by improving the roundness of the metal ring 72, the clearance between the reinforcement ring 70 and the forming mold 78 can be further reduced. For this reason, the amount of eccentricity between the reel hub 45 and the metal ring 72 is kept even smaller, so that the demand to increase the speed of rotation of the reel 28, for example, can be accommodated.

What is claimed is:

1. A reel comprising:
a reel hub that is formed in a cylinder shape from a resin material and whose outer peripheral surface is a take-up surface for winding recording tape; and
an insert body attached to an inner side of the reel hub and provided with a cylinder-shaped metal ring comprising a metal material, and further provided with a resin layer that covers an inner peripheral surface of the metal ring across substantially its entire surface excluding part of one axial direction end of the metal ring.

2. A recording tape cartridge comprising:
a case;
a reel that is rotatably housed inside the case, the reel including
a reel hub that is formed in a cylinder shape by a resin material and whose outer peripheral surface is a take-up surface for winding recording tape, and
an insert body attached to an inner side of the reel hub and provided with a cylinder-shaped metal ring comprising a metal material, and further provided with a resin layer that covers an inner peripheral surface of the metal ring across substantially its entire surface excluding part of one axial direction end of the metal ring; and
recording tape that is wound around the outer peripheral surface of the reel hub and is capable of being taken up and pulled out with rotation of the reel.

3. The insert body of claim 2, wherein a roundness of an inner peripheral surface of the resin layer is 50 μm or less.

4. The insert body of claim 2, wherein the resin layer is formed by injection molding in another mold before being loaded in a mold for forming the reel hub.

5. The insert body of claim 2, wherein the metal ring includes a region not covered by the resin layer at a portion including and continuing from an end surface of the inner peripheral surface.

6. The insert body of claim 2, wherein the metal material includes aluminum or an aluminum alloy.

7. The insert body of claim 2, wherein the resin layer covers at least a part of the inner peripheral surface of the metal ring.

8. A recording tape cartridge comprising:
a case;
a reel that is rotatably housed inside the case, the reel including a reel hub that is formed in a cylinder shape by a resin material and whose outer peripheral surface is a take-up surface for winding recording tape, and an insert body attached to an inner side of the reel hub and provided with a cylinder-shaped metal ring comprising a metal material, and further provided with a resin layer that covers an inner peripheral surface of the metal ring; and recording tape that is wound around the outer peripheral surface of the reel hub and is capable of being taken up and pulled out with rotation of the reel, wherein the metal ring is covered by the resin layer entirely on both end surfaces, the inner peripheral surface and an outer peripheral surface.

\* \* \* \* \*